United States Patent [19]

Heinze

[11] 4,102,424
[45] Jul. 25, 1978

[54] TAG WHEEL LIFT

[75] Inventor: Alvin L. Heinze, Weld County, Colo.

[73] Assignee: Hydraulics Unlimited Manufacturing Co., Eaton, Colo.

[21] Appl. No.: 813,847

[22] Filed: Jul. 8, 1977

[51] Int. Cl.$^2$ .............................................. B62D 61/12
[52] U.S. Cl. ............................. 180/24.02; 280/43.18; 280/43.23; 280/704
[58] Field of Search .................. 180/24.02; 280/81 R, 280/43.23, 43.2, 686, 676, 704, 43.18; 267/54 R, 54 C; 254/86 H

[56] References Cited

U.S. PATENT DOCUMENTS

| 2,774,606 | 12/1956 | Burweger | 280/766 |
|---|---|---|---|
| 3,195,917 | 7/1965 | Baldock | 280/81 R X |
| 3,243,193 | 3/1966 | Fulmer et al. | 280/43.23 X |
| 3,285,621 | 11/1966 | Turner | 280/43.23 X |
| 3,384,384 | 5/1968 | Diehl | 280/43.18 |
| 3,533,641 | 10/1970 | Driskill | 280/43.18 |
| 3,659,671 | 5/1972 | Heinze | 180/24.02 |
| 3,831,210 | 8/1974 | Ow | 280/704 X |
| 3,856,319 | 12/1974 | Hardy | 280/43.18 |
| 3,915,470 | 10/1975 | Jansen | 280/676 |

Primary Examiner—Kenneth H. Betts
Attorney, Agent, or Firm—Ralph F. Crandell

[57] ABSTRACT

A tag wheel lift includes first and second brackets, spaced longitudinally and provided with inner and outer legs, with the former being attached to a mounting plate by spacing blocks which provide clearance for nuts for pivot bolts which extend through the legs. One end of a leaf spring for the corresponding tag wheel is pivoted on a bolt or pin extending between the lower ends of the legs of the first bracket, while the other end of the spring is pivoted between a pair of lower links, at the lower rear corner of a rearward offset. A hydraulic cylinder is pivoted on the first bracket, while the piston rod thereof is pivoted between the movable ends of a pair of upper links, on the same pivot which connects the upper links with the lower links. The upper ends of the upper links are pivoted between the inner and outer legs of the second bracket, with the outer leg being restricted in length to provide clearance for upward movement of the lower links to folded or retracted position, with the rearwardly extending offset moving past the outer leg of the second bracket. This moves the corresponding end of the tag wheel spring to a higher position, to place the corresponding wheel a sufficient distance above the road. In extended position, the links are essentially in line, to cause the tag wheel to engage the rod beneath. A tag wheel lift is mounted on each side of the chassis and the two are retracted and extended simultaneously, through appropriate controls.

10 Claims, 8 Drawing Figures

TAG WHEEL LIFT

This invention relates to tag wheel lifts, which are devices for raising and lowering a set of normally non-driven wheels of a truck or the like, utilized in conjunction with the driven wheels. Thus, the present invention relates to the subject matter of my prior invention disclosed in U.S. Pat. No. 3,659,671.

BACKGROUND OF THE INVENTION

In the operation of trucks, particularly those which at times may carry lighter loads and at other times may carry much heavier loads, the desirability of additional wheels to support additional loads has been evident for a long time. In the case of farm trucks, for instance, the lighter loads carried during normal farm work, but at other times the much heavier loads carried, such as during the harvesting period of sugar beets, has occasioned the application of tag wheels or supplementary wheels to trucks. In view of the fact that the harvesting time of sugar beets, for instance, is relatively short and it is desirable to transport the sugar beets from the field to the sugar factory or point of rail shipment as soon as possible, in order to reduce loss of sugar content through aging, it is common practice to add to the height of the sides of the truck body when carrying sugar beets. Such increased load, due to the additional weight, may cause the springs or associated parts of the normal or drive wheels to be overloaded with a consequent danger of failure. Thus, it has been common practice to add one or more sets of tag wheels or non-driven wheels ahead of or behind the driven wheels, in order to support the extra load. These tag wheels normally have their own set of springs and are connected by an axle, so that an axle type air brake can be utilized in providing a braking effect corresponding to the heavier load being carried. It is uneconomical to install the tag wheels when use thereof is desired, and to remove the tag wheels after the need for their use has terminated. Also, after the tag wheels have been installed on the truck, there are many times when the load carried by the truck is sufficiently light that the tag wheels are not necessary and it is thus desirable to lift the tag wheels. However, when the driven wheels sink into a mud hole or the like, the non-driven tag wheels may prevent sufficient weight on the driven wheels to provide adequate traction to pull the truck out of the mud hole, with the attendant necessity for a towing truck or tractor to be used. Since a truck mired in, or about to be mired in, a mud hole is proceeding at a very low speed, there is not such a weight upon the driven wheels and springs, even when the truck body contains a very heavy load, that the danger of breaking the springs or other parts is acute. Thus, when a heavily loaded truck has or tends to become mired in a mud hole, it is desirable to lift the tag wheels temporarily, in order to transfer the load to the driven wheels and thereby enable the driven wheels to produce sufficient traction.

My prior U.S. Pat. No. 3,659,671 discloses a tag wheel lift which is suitable for many installations but does involve certain installation expenses which might be avoided, including the remounting of a spring support at each side for the drive wheels and the installation of a hydraulic cylinder and a pivot shaft on the underside of the truck body, between the chassis channels. Some possible purchasers have indicated objection to the shifting of the drive wheel springs for normal operation at light loads, although this shift is a valuable feature for loading of the drive wheels, as when pulling out of a mud hold or the like. An increase in the distance which the tag wheels are lifted, without affecting the drive wheels, appeals to certain possible purchasers.

SUMMARY OF THE INVENTION

In accordance with the present invention, a tag wheel is pivoted upwardly and downwardly independently of the drive wheel. This avoids any expense and time required for changing a support for one end of the drive wheel springs for installation, as in U.S. Pat. No. 3,659,671. Also, it has been found that a pair of hydraulic cylinders, one at each side of the truck frame, may be utilized in lifting or extending the support for one end of each of the tag wheel springs without the necessity for more accurate synchronization. The tag wheel at each side of the frame, in the extended or down position of the corresponding spring, has a smaller reaction against the pressure within the hydraulic cylinder, thereby reducing the pressure which should be maintained in the cylinder, when the tag wheels are down. This is accomplished by connecting one end of each tag wheel spring to a toggle linkage which is collapsed for lifting the corresponding tag wheel, but is moved to an in line position, when the tag wheel is down. An offset, away from the tag wheel at the lower end of the lower link, decreases the distance through which the pivot connection between the upper and lower links are required to move for shifting the pivoted movable end of the tag wheel spring for a maximum distance, between the up position and the down position of the tag wheel and vice versa. A pair of brackets are placed at spaced positions, with one bracket pivotally supporting a hydraulic cylinder and one end of the tag wheel spring and the other bracket pivotally supporting the toggle links. The brackets are conveniently attached to a mounting plate, to facilitate attachment as a unit to the frame of the truck, on each side thereof. For the opposite sides, the brackets are made in mirror images but placed at corresponding positions.

The above and additional or more detailed features of this invention will become apparent from the description which follows, taken in conjunction with the accompanying drawings, in which.

DETAILED DESCRIPTION OF THE INVENTION

Figure 1:
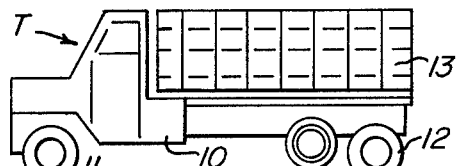
FIG. 1 is a diagram, on a reduced scale, of a truck having a tag wheel in an upper or retracted position.
Figure 2:
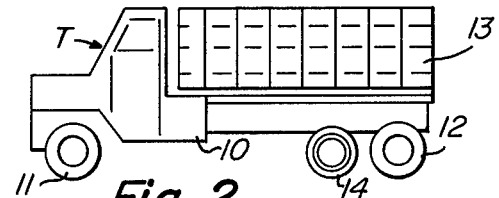
FIG. 2 is a diagram similar to FIG. 1, but showing the tag wheel in a down or road engaging position.

As in FIGS. 1 and 2, a tag wheel lift of this invention may be mounted on opposite sides of a truck T having a body 10, front wheels 11 and drive wheels 12, with the front wheels and drive wheels duplicated on opposite sides of the truck. The truck body may carry a load 13, it being understood that the body 10 and the load 13 thereon are shown for illustrative purposes only and that a different type of body will be installed on the truck frame for carrying other types of loads, such as sugar beets. A tag wheel 14, also at each side of the truck, may be installed in front of each drive wheel 12 and moved by the tag wheel lift to the up position of FIG. 1, or to the down position of FIG. 2. If desired, a tag wheel 14 may be installed behind a drive wheel 12, or both in front and behind the drive wheel 12, provided there is room. The tag wheel lift of this invention is illustrated and described with reference to one side only of the truck, but it will be understood that a corresponding tag wheel lift will be installed at the opposite side of the truck, with parts corresponding to certain parts, but mirror images of the parts described below. In order to permit the use of brakes for the tag wheels, the tag wheels may be connected by an axle extending through an axle housing 15 attached to the underside of a leaf spring S by a conventional clamp 16.

Figure 3:
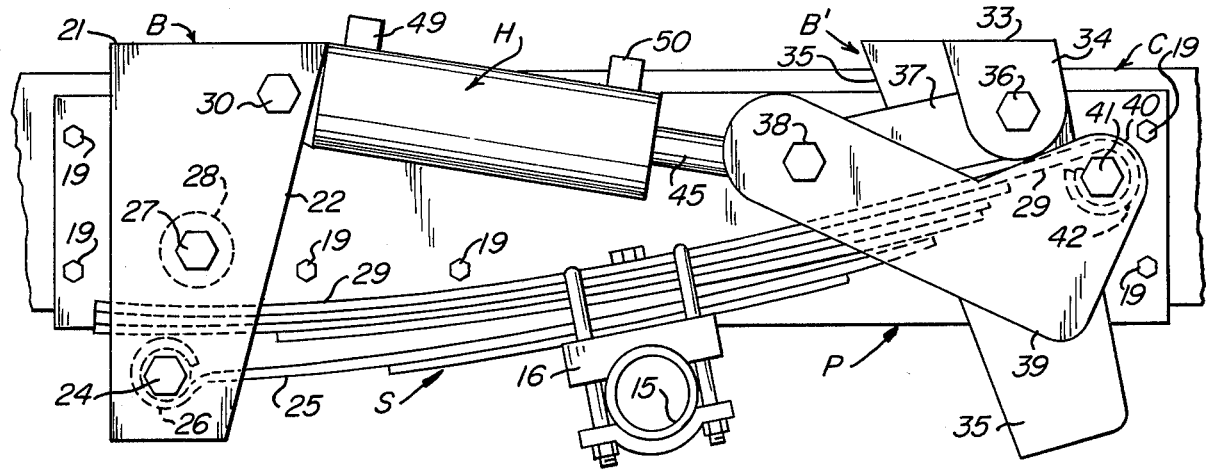
FIG. 3 is a side elevation of a tag wheel lift of this invention, in the retracted position corresponding to FIG. 1 but with the tag wheel itself omitted to show more clearly parts of the lift.
Figure 4:
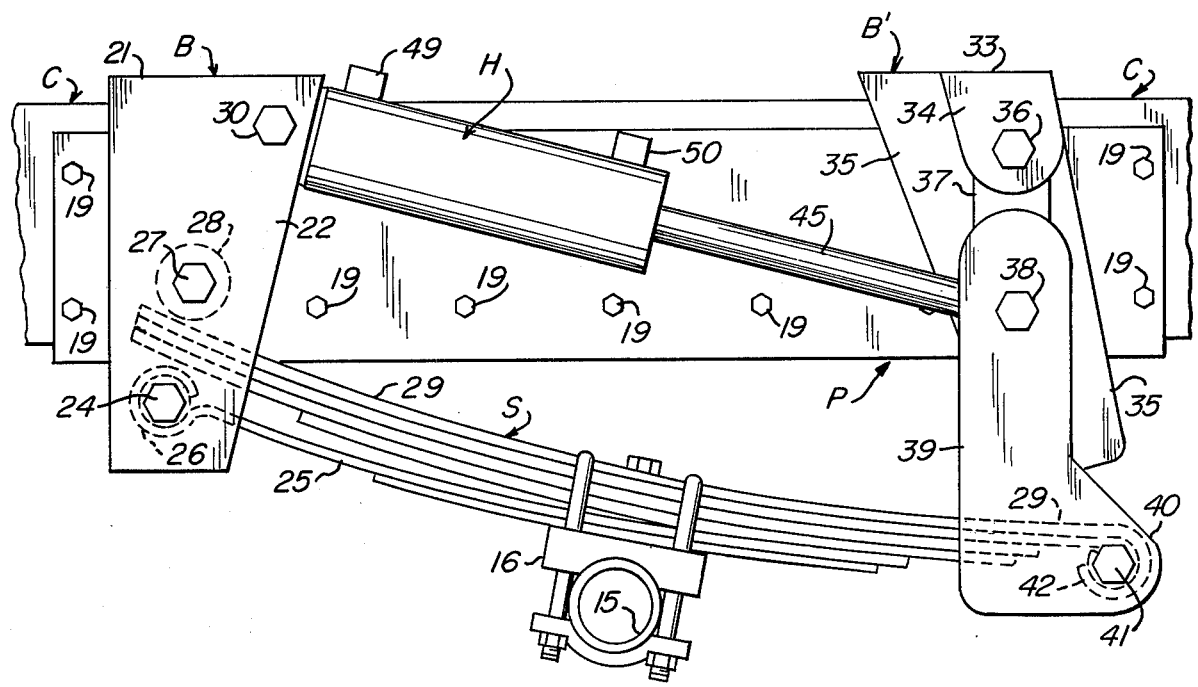
FIG. 4 is a side elevation similar to FIG. 3, but showing the lift in the down position, corresponding to the position of the tag wheel in FIG. 2.
Figure 5:
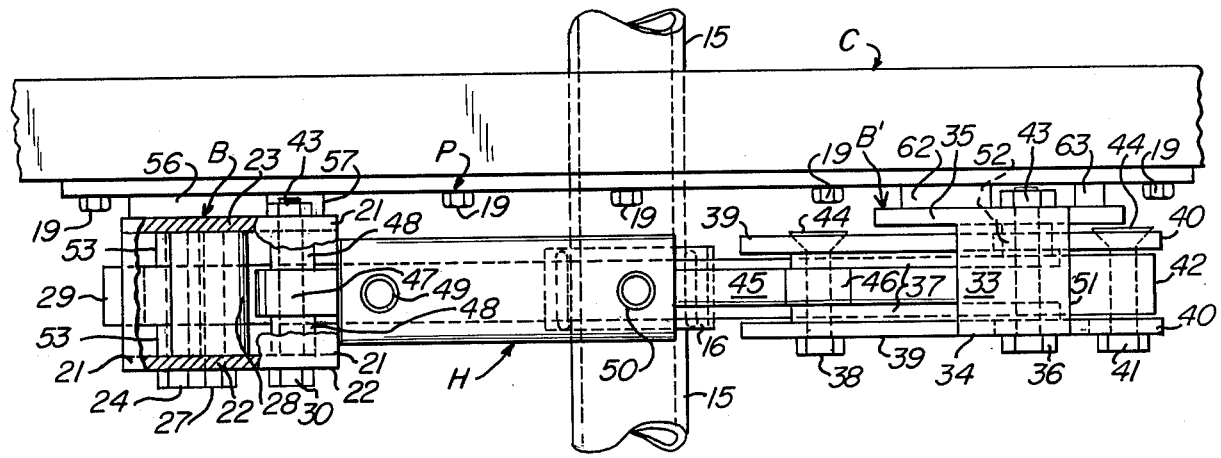
FIG. 5 is a top plan view of the tag wheel lift in the position of FIG. 3.
Figure 6:
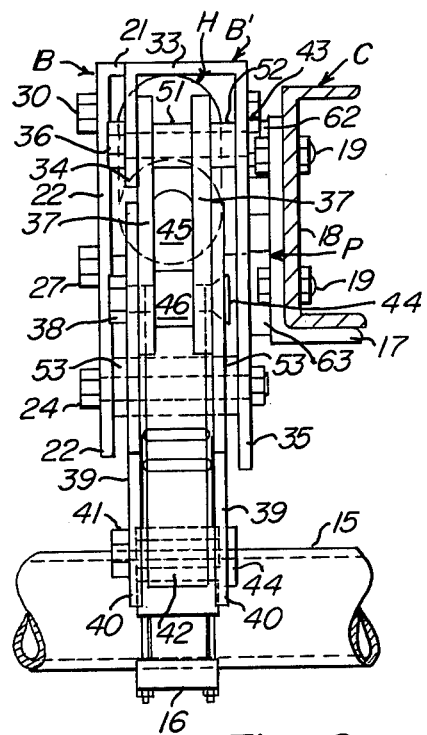
FIG. 6 is a rear end view of the tag wheel lift in the position of FIG. 4.

A tag lift of this invention includes a pair of brackets comprising a spring bracket B and a link bracket B' mounted in longitudinally spaced relation on a plate P having a lower flange 17, as in FIG. 6, adapted to extend under a channel C of the truck chassis and which extends longitudinally of the truck bed, at each side thereof, with the plate attached to a web 18 of the channel by bolts 19. Spring bracket B, as in FIGS. 3-5, is provided with a top 21, an outside leg 22 and an inside leg 23, the latter of which is attached to plate P in a manner described later. A lower bolt 24 extends between the legs of bracket B to provide a pivot for a lower leaf 25 of the spring S by a ring type connector 26 surrounding a conventional bushing mounted on the bolt. Spaced above bolt 24 is a bolt 27 which extends through both legs of bracket B and is encircled by a roller 28 for engagement with top leaves 29 of the spring S, as in FIG. 4, when the tag wheel is down and receives a portion of the load. A top bolt 30 provides a pivot for the closed end of an hydraulic cylinder H, in a manner described below.

The link bracket B', as in FIGS. 3-6, is provided with a top 33, from the outer edge of which depends a short outside leg or ear 34, with the top 33 also being connected to or integral with an inside leg 35 which may be substantially wider than the outside leg and is attached in spaced relation to plate P, in a manner described below. A link pivot bolt 36 extends through ear 34 and inside leg 35 to form a pivot point for a pair of upper link bars 37, spaced apart for a purpose described below. The upper link bars are pivotally connected to a central pivot bolt 38 which, in turn, pivotally connects the upper link bars 37 with a pair of lower link bars 39, disposed on the outside of each corresponding upper link bar. The lower link bars 39 are provided with a rearward offset 40, adjacent the rear lower edge, through which a spring pivot bolt 41 extends to form a rear pivot connection for the top leaves 29 of the spring S, as through ring connections 42 encircling a conventional bushing mounted on bolt 41. Bolts 24, 27, 30 and 36 may have a conventional head outside the respective bracket and bolts 27, 30 and 36 a thin nut 43 between the bracket and plate P, as in FIG. 5, which facilitate placement in a restricted space. Bolts 38 and 41 have heads on the outside of the lower link 39, but on the inside of the inner lower link 39, for clearance purposes, a countersunk nut 44, as in FIG. 5, having a hex flange which engages the inner side of inner link bar 39 but is sufficiently thin to clear the inside leg 35 of bracket B' during movement between the upper position of FIG. 3 and the down position of FIG. 4.

The outer end of a piston rod 45, extending from hydraulic cylinder H, is pivotally connected to pivot bolt 38 which pivotally connects the pairs of link bars 37 and 39, as through a bearing ring 46 which spaces the link bars apart, as in FIGS. 5 and 6. As will be evident, when the piston rod 45 is retracted, the link bars 37 and 39 will be collapsed or folded upwardly to the position of FIG. 3, while when the piston rod 45 is extended, as in FIG. 4, the links will be straightened to the alignment position shown. The closed end of cylinder H is pivotally mounted on pivot bolt 30 of bracket B, as through an ear 47, which may be maintained in a central position on bolt 30 by a bushing 48 at each side thereof. Hydraulic fluid may be supplied to and returned from the closed end of cylinder H through a hose connection 49, while hydraulic fluid may similarly be supplied to or returned from the piston rod end of the cylinder through a hose connection 50. A bushing 51, as in FIGS. 5 and 6, may surround bolt 36 to maintain the upper link bars 37 spaced apart in a parallel position. Thus, the bushing 51 preferably has the same thickness as the bearing ring 47 between the opposite ends of the upper links. A bushing 52 may also be placed between the inner link bar 37 and the inside leg 35 of the bracket B', for a corresponding purpose. A bushing 53, also as in FIGS. 5 and 6, may be placed around bolt 24 at opposite sides of the ring connection 26 for spring leaves 25, to maintain the spring centered between the legs 22 and 23 of the bracket B.

Figure 7:
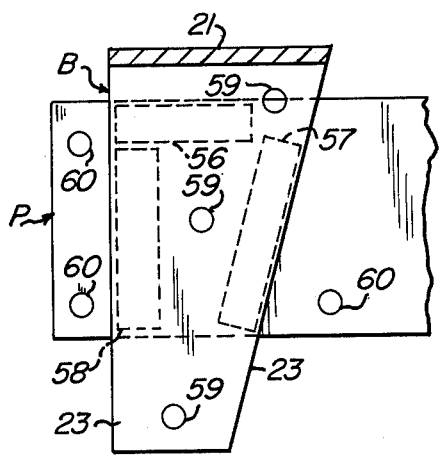
FIG. 7 is a front elevation of one bracket of FIGS. 3 and 4, in longitudinal section to show more clearly attachment of the bracket to a mounting plate adjacent one end thereof.
Figure 8:
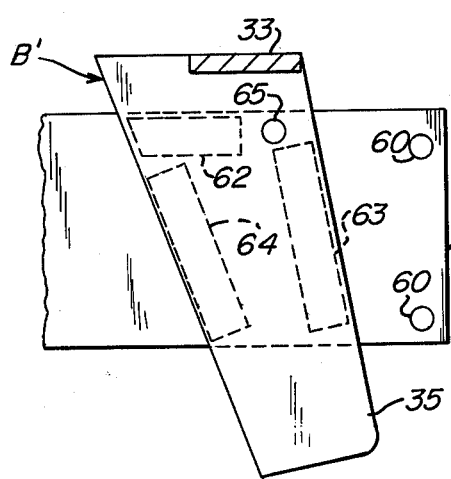
FIG. 8 is a view similar to FIG. 7 but showing a second bracket of FIGS. 3 and 4 adjacent the opposite end of the mounting plate.

Bracket B, as in FIG. 7, may be attached in spaced, parallel relation to plate P, as by spacing blocks 56, 57 and 58. The spacing blocks may be attached to the inner leg of bracket B and to plate P by welding, such as gas or arc welding, and positioned so that as much linear welding as possible may be done along an edge of leg 23 or plate P, with each end of a block reached for welding from an edge of leg 23 or plate P. The blocks are also spaced at positions which limit interference with the installation of bolts 24, 27 or 30, which extend through bolt holes 59 in leg 23, or bolts 19, which extend through holes 60 in plate P. Thus, block 56 may be positioned along the upper edge of plate P, extending from the left side of leg 23 of bracket B to a position spaced from the upper hole 59 to provide clearance for the nut for bolt 30, as in FIG. 5, while block 57 may extend upwardly along the right edge of leg 23, from the lower edge of plate P to a position similarly spaced from the upper hole 59. Block 58 may extend upwardly, along the left edge of leg 23, from the lower edge of plate P to the block 56. Similarly, inside leg 35 of bracket B', as in FIG. 8, may be attached in spaced, parallel relation to plate P adjacent the opposite end of the plate, as by spacing blocks 62, 63 and 64. These blocks may again be attached in a suitable manner, as by gas or arc welding, and positioned so that as much linear welding as possible may be done, as in the case of the blocks attaching bracket B to plate P. Again, the blocks are also placed to limit interference with the installation of bolt 36, which extends through a hole 65, or bolts 19, which extend through holes 60. The brackets B and B' are spaced from the respective ends of the mounting plate P to accommodate the end bolts 19.

The tag wheel lift on the opposite side of the chassis of the truck includes, of course, a corresponding hydraulic cylinder H having a hose connection 49 for the closed end of the cylinder and a hose connection 50 for the piston rod end of the cylinder. The corresponding hose connections of the two cylinders, on opposite sides of the truck, may be supplied with hydraulic fluid simultaneously and the other hose connections connected to a common fluid exhaust line, which leads the exhausted fluid into a reservoir. A conventional pump for supplying hydraulic fluid may be driven by the power takeoff of the truck motor adjacent which the reservoir may be mounted, with simultaneously operated control valves for supplying pressure and connecting to exhaust, respectively, controlling flow through the hoses connected to the respective hose connections 49 and 50. These control valves may, in turn, be actuated through a toggle switch mounted at a convenient position for the operator, as in the cab, so that the switch may be flipped in one direction, such as to cause the tag wheels to be retracted, or in the opposite position, such as to cause the tag wheels to be lowered. As will be evident, hydraulic fluid pressure supplied to hose connection 49 of the cylinders on opposite sides of the truck will extend the corresponding piston rod 45 to move the link bars 37 and 39 from the retracted position of FIG. 3 to the extended position of FIG. 4, on each side. Extension of piston rod 45 will, of course, cause the piston to force hydraulic fluid out of the corresponding end of the cylinder through hose connection 50, for flow back to the reservoir. Similarly, hydraulic fluid supplied to hose connection 50 of the cylinders on opposite sides of the chassis will cause each piston rod 45 to be retracted and the link bars 37 and 39 to be moved from the extended position of FIG. 4 to the retracted position of FIG. 3, thereby lifting the tag wheels. At the same time, the movement of each piston inside its cylinder, toward the closed end, will force hydraulic fluid out through the corresponding hose connection 49 for flow to the reservoir. As will be evident, by supplying the respective ends of the hydraulic cylinders on opposite sides of the chassis with hydraulic fluid from the same pump and controlled by a single valve and switch, as well as returning hydraulic fluid from the opposite ends of the cylinders through the same valve, again controlled by the same switch, the movement of the piston rods should be essentially simultaneous on opposite sides of the chassis. Since the link bars 39 on opposite sides of the chassis are connected only to the springs for the same axle housing and not to any spring for a drive wheel, a lag in the operation of one cylinder should not be objectionable, since the springs S on each side can accommodate a difference in the vertical positions of the respective ends of axle housing 15 and the corresponding tag wheel 14. Thus, a difference in the time when piston rod 45 reaches the end of its travel, in moving either to the position of FIG. 3 or the position of FIG. 4, is readily accommodated. It will be noted that, with the control switch in one position, as for instance, to retract each piston rod, hydraulic fluid pressure will continue to be supplied to hose connection 50 for each until both piston rods are fully retracted. Also, with the control switch in the opposite position to extend each piston rod, hydraulic fluid pressure will continue to be supplied to hose connection 49 until both piston rods are fully extended, to the position of FIG. 4.

In the fully retracted position of FIG. 3, the rear angular edge of offset 40 may abut the lower edge of ear 34, as shown, but the weight of the spring and tag wheel is still supported by the folded links. Thus, it is desirable for the hydraulic pressure to be maintained at hose connection 50, to maintain the piston rod in retracted position. Thus, it is suitable to turn off the pump but retain the pressure in the lines and, for this purpose, the control switch may have a center position in which the pump is turned off but the valve permitting flow of hydraulic fluid under pressure is closed, to trap the pressure between the valve and the insides of the cylinders. The valve previously connecting with the reservoir, from one standpoint, may be left open or closed, since it is immaterial whether hose connections 49 remain in communication with the reservoir. However, for a reason pointed out below, it is preferable to close this valve also. Similarly, when piston rod 45 is moved to the extended position of FIG. 4, it is desirable for the hydraulic pressure to be maintained at each hose connection 49, to maintain each piston rod in extended position. The upward forces transmitted to pivot bolts 41 by ring connections 42 have only a small component in a direction tending to collapse link bars 37 and 39, but such components are desirable to prevent shock loads from tending to pull the piston rod from either or both cylinders. Thus, again it is sufficient merely to trap the fluid under pressure in the cylinders. Thus, a corresponding midpoint of the switch may be used to shut off the pump and close the valve through which hydraulic fluid was previously supplied to the cylinders through hose connection 49. Since the opposite pressure supply valve was previously closed, both valves are then closed, which simplifies the midpoint connections for the switch, i.e. to close both supply valves to insure that the previously open valve, irrespective of which it is, will now be closed. Similarly, the midpoint of the switch can be connected to insure that both exhaust valves, i.e. that connecting the hoses from hose connections 50 and that connecting the hoses from hose connections 49 with the reservoir, will be closed. This is desirable to insure that the wrong exhaust valve is not opened, i.e. one which would cause drainage of the end of the hydraulic cylinder in which pressure is to be maintained.

The offset 40 of link bars 39 is conveniently generally triangular and pivot bolt 41 for the corresponding end of the spring S is located in the lower far corner, to assist materially in reducing the length of the stroke of the piston rod of the hydraulic cylinder and also to increase the height to which the tag wheel can be lifted. Since the spring S has a conventional length for the axle housing to which it is connected, the offset 40 accommodates a longer leaf spring. Offset 40 thus also permits the bracket B' to be mounted closer to the bracket B, which correspondingly decreases the required length of the piston rod 40 and cylinder 41, with a corresponding reduction in the length of the stroke required to move the upper and lower pairs of link bars between the positions of FIGS. 3 and 4. In the folded or retracted position of FIG. 3, the offset 40 permits the pivot bolt 41 for the corresponding end of the spring S to be lifted to a considerably higher position, due to the upward extension of the offset 40 rearwardly of the ear 34 of bracket B'. This is a much higher position than would be possible with a straight link, due to abutment of the link with the underside of ear 34. As will be evident from FIG. 3, the position of the pivot bolt 41 would be considerably lower, if the link 39 had parallel sides and the upper side was moved into abutment with the lower edge of ear 34.

As indicated previously, a set of tag wheels may be positioned either to the front or the rear of the drive wheels, or at other positions, depending on the space available, and any concentration of the load expected to be carried. In some instances, a set of tag wheels or auxiliary wheels may be positioned both forwardly and rearwardly of the drive wheels; in this instance, the tag wheel lift for each set may be similar to those herein described, while the two sets of tag wheels may be controlled individually, as through separate toggle switches and control valves described above, or concurrently, as through one toggle switch and a single set of control valves.

Although a preferred embodiment of this invention has been illustrated and described, it will be understood that other embodiments may exist and various changes made, all without departing from the spirit and scope of this invention.

What is claimed is:

1. A tag wheel lift for a truck or the like having a chassis, at least one drive wheel at each side of said chassis, mounting means including spring means for supporting said chassis from said drive wheels, at least one tag wheel at each side of said chassis and spaced longitudinally from said drive wheels, and spring means for said tag wheels, whereby said tag wheels, when in use, may support a portion of the load on said chassis, said lift comprising:
    first bracket means attachable to said chassis at each side thereof and having a connection for one end of a spring means for the corresponding tag wheel;
    second bracket means attachable to said chassis and having a pivot for an upper link means;
    lower link means pivotally connected at one end of said upper link means and having a lower end provided with a connection for said spring means for the corresponding tag wheel;
    said upper and lower link means being movable from a retracted position in which the connection of said tag wheel spring means to said lower link means lifts said tag wheel above the road and an extended position in which said end of said tag wheel spring means is in a lowered position to cause the corresponding tag wheel to engage the road and support, through said tag wheel spring means, a portion of the load on said chassis; and
    hydraulic means for moving the pivotal connection between said upper and lower link means, to move said upper and lower link means between said retracted and extended positions.

2. A tag wheel lift as defined in claim 1, wherein:
    the lower portion of said lower link means is provided with an offset in a direction away from said tag wheel; and
    said connection for the corresponding end of said tag wheel spring means is mounted at a remote corner of said offset.

3. A tag wheel lift as defined in claim 1, wherein:
    said upper link means comprises a spaced pair of upper links;
    said lower link means comprises a spaced pair of lower links; and
    the pivotal connection of said hydraulic means is disposed between one pair of said links.

4. A tag wheel lift as defined in claim 1, wherein:
    said hydraulic means includes a cylinder and a piston rod; and
    a pivotal connection is formed between the closed end of said cylinder and said first bracket means.

5. A tag wheel lift as defined in claim 4, wherein:
    said first bracket is provided with inner and outer legs;
    an uper pivot bolt for said hydraulic cylinder extends between said legs; and
    a lower pivot for said tag wheel spring means extends between said legs.

6. A tag wheel lift as defined in claim 1, wherein:
    said first and second bracket means are mounted in longitudinally spaced relation on a plate; and
    said plate is provided with means for attachment to a member of said truck chassis.

7. A tag wheel lift as defined in claim 6, wherein:
    said first and second brackets means have laterally spaced inner and outer legs through which pivot bolts extends; and
    said inner leg of each said bracket is disposed parallel to but in spaced relation from said plate.

8. A tag wheel lift as defined in claim 7, wherein:
    a series of spacing blocks are disposed between each said inner leg and said plate and attached to said plate and the corresponding inner leg, to provide sufficient space for nuts maintaining said pivot bolts in position on said brackets.

9. A tag wheel lift as defined in claim 1, wherein:
    said second bracket means is provided with inner and outer legs;
    said lower link means are provided with a lower rearward offset having pivot means for the rear end of said tag wheel spring means; and
    said outer leg of said second bracket is restricted in length to provide clearance for upward movement of said lower link means with said lower rearward offset extending rearwardly of said outer leg.

10. A tag wheel lift as defined in claim 9, wherein:
    said upper link means comprises a pair of links;
    said lower link means comprises a pair of links, with said upper links between said lower links at the pivotal connection therebetween but spaced apart for accommodating a pivotal connection of said hydraulic means;
    the inner lower link is movable adjacent the inner leg of said second bracket means; and
    said outer lower link is movable beneath the outer leg of said second bracket means.

* * * * *